United States Patent
Zhu et al.

(10) Patent No.: US 10,448,182 B2
(45) Date of Patent: Oct. 15, 2019

(54) ANTENNA USING CONDUCTOR AND ELECTRONIC DEVICE THEREFOR

(71) Applicants: BingKe Zhu, Shenzhen (CN); KaiYan Gao, Shenzhen (CN)

(72) Inventors: BingKe Zhu, Shenzhen (CN); KaiYan Gao, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 361 days.

(21) Appl. No.: 15/415,981

(22) Filed: Jan. 26, 2017

(65) Prior Publication Data
US 2018/0160246 A1    Jun. 7, 2018

(30) Foreign Application Priority Data

Dec. 6, 2016   (CN) .......................... 2016 1 1108574
Dec. 6, 2016   (CN) .......................... 2016 1 1108994

(51) Int. Cl.
*H04R 31/00*    (2006.01)
*H04R 9/06*    (2006.01)

(52) U.S. Cl.
CPC ............. *H04R 31/003* (2013.01); *H04R 9/06* (2013.01); *H04R 2307/204* (2013.01)

(58) Field of Classification Search
CPC .......... H04R 31/003; H04R 7/18; H04R 9/06; H04R 2307/204; H04R 2499/11; B29C 45/1671; B29C 45/561; B29K 2105/0061; B29L 2031/38

USPC .......................................................... 181/167
See application file for complete search history.

(56) References Cited

U.S. PATENT DOCUMENTS

| | | | | |
|---|---|---|---|---|
| 9,173,033 | B1* | 10/2015 | Lin | H04R 7/125 |
| 10,231,071 | B2* | 3/2019 | Guo | B29C 43/245 |
| 2014/0083795 | A1* | 3/2014 | Huang | H04R 7/125 |
| | | | | 181/167 |
| 2015/0310848 | A1* | 10/2015 | Zhu | G10K 13/00 |
| | | | | 181/167 |
| 2016/0205487 | A1* | 7/2016 | Hsieh | H04R 31/003 |
| | | | | 181/171 |
| 2018/0041838 | A1* | 2/2018 | Chang | H04R 7/16 |
| 2018/0115836 | A1* | 4/2018 | Hsieh | H04R 19/04 |

\* cited by examiner

*Primary Examiner* — Forrest M Phillips
(74) *Attorney, Agent, or Firm* — IPro, PLLC; Na Xu

(57) ABSTRACT

The present disclosure discloses a method for forming a silica gel diaphragm and a silica gel diaphragm prepared using the method. The method for forming a silica gel diaphragm includes at least the following steps: step S1: providing a hot pressing mold, and placing at least a dome as an embedment into the hot pressing mold; step S2: injecting liquid silica gel into the hot pressing mold; and step S3: molding the liquid silica gel via hot pressing so as to obtain a silica gel membrane which is at least connected with the dome. The method for forming a silica gel diaphragm provided by the present disclosure is easy to conduct and the formed silica gel diaphragm has good performance.

6 Claims, 3 Drawing Sheets

ANTENNA USING CONDUCTOR AND ELECTRONIC DEVICE THEREFOR

TECHNICAL FIELD

The present disclosure relates to the technical field of electronic products and, specifically, relates to a method for forming a silica gel diaphragm and a silica gel diaphragm prepared using the method.

BACKGROUND

Speakers as sounding devices for electronic devices such as cell phones and tablets, have been widely applied in people's daily life. A speaker includes a vibrating system and a magnetic circuit system configured to drive the vibrating system to vibrate, the vibrating system includes a diaphragm and a voice coil configured to drive the diaphragm to vibrate, the vibration of the diaphragm prompts vibration of the surrounding air so as to realize the conversion from an electric signal to a sound signal. In order to improve sound releasing effect and optimize performance of the product, many attempts and explorations with respect to structures and materials of the diaphragm have been made, and the application of a silica gel diaphragm is an example thereof.

Silica gel materials themselves have strong flowability and a wide range of adaptive temperature. Therefore, when a speaker is working, the diaphragm is not readily deformed due to temperature changes, so as to better guarantee the performance of the speaker. In addition, the silica gel materials have strong mechanical performance and good flexibility, which is advantageous in improving the performance of the diaphragm. For these reasons, the silica gel diaphragm has drawn broad attention.

In the relevant art, a silica gel diaphragm includes a dome, a silica gel membrane and a supporting frame which are connected with each other, and the silica gel diaphragm is usually formed by forming each of the components separately and then successively adhering these components together. Since the silica gel membrane is respectively connected with the dome and the supporting frame, its shape and size may be influenced by the shapes and sizes of the dome and the supporting frame, which proposes high requirements on the forming process and needs special and precise designs to meet the assembling requirements of all the components so as to maintain the silica diaphragm with good performance. Therefore, different silica gel diaphragm molding moulds are needed corresponding to the products of different specifications, which thus results in high production cost. Moreover, there exists situations of uneven adhesion when adhering the components, which also influences the service performance of the silica gel diaphragm.

Therefore, it is necessary to provide a new method for forming a silica gel diaphragm to solve the above technical problem.

DESCRIPTION OF EMBODIMENTS

The present disclosure is further illustrated as follows with reference to the accompanying drawings and embodiments.

Embodiment 1

Figure 1:
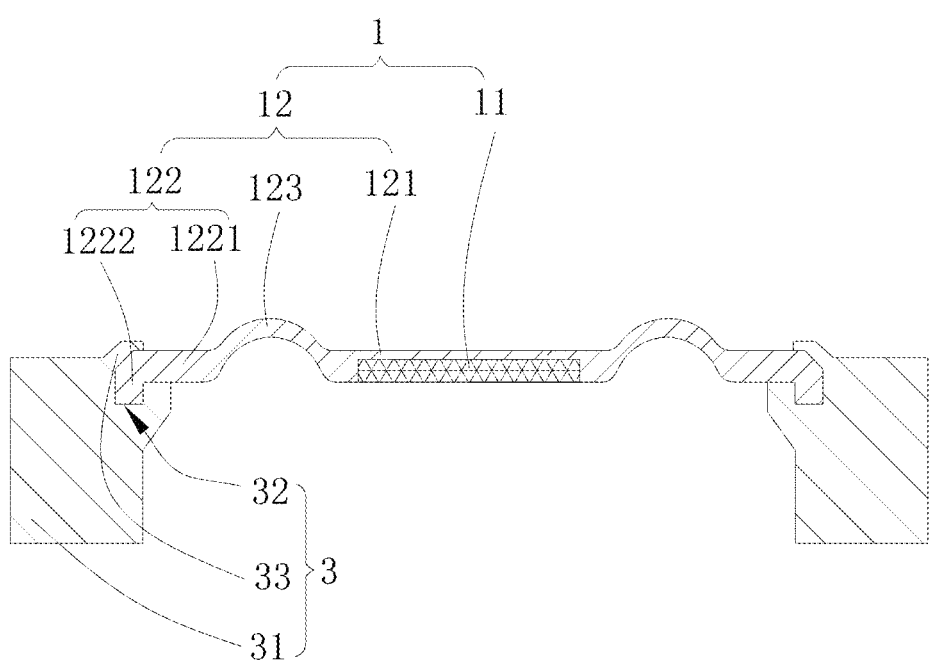
FIG. 1 is a structural schematic diagram of a silica gel diaphragm obtained using a method for forming a silica gel diaphragm in accordance with Embodiment 1.

Please refer to FIG. 1, which is a structural schematic diagram of a silica gel diaphragm obtained using a method for forming a silica gel diaphragm in accordance with Embodiment 1. The silica gel diaphragm 100 includes a silica gel membrane component 1 and a supporting frame 3, and the silica gel membrane component 1 is connected with the supporting frame 3.

Figure 2:
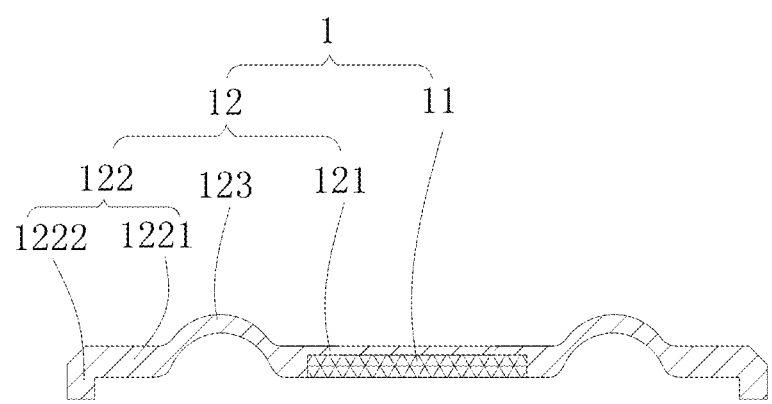
FIG. 2 is a structural schematic diagram of a silica gel membrane component in the silica gel diaphragm as shown in FIG. 1.

Please refer to FIG. 2, which is a structural schematic diagram of a silica gel membrane component in the silica gel diaphragm as shown in FIG. 1. The silica gel membrane component 1 includes a dome 11 and a silica gel membrane 12, and the dome 11 is wrapped up by the silica gel membrane 12.

The silica gel membrane 12 includes a first connecting portion 121, a second connecting portion 122 and a suspension portion 123 which connects the first connecting portion 121 with the second connecting portion 122. The dome 11 is wrapped up by the first connecting portion 121.

The second connecting portion 122 includes a body portion 1221 which is connected with the suspension portion 123, and a fixing portion 1222 which is bended and extends from an end of the body portion 1221.

The supporting frame 3 is connected with the second connecting portion 122 of the silica gel membrane component 1 in such a way that a part of the second connecting portion 122 is embedded into the supporting frame 3.

The supporting frame 3 includes a frame body 31 with a ring-shaped structure, a ring-shaped groove 32 which is formed on an upper surface of the frame body 31, and a pressing block 33 which is connected with the frame body 31.

The fixing portion 1222 of the second connecting portion 122 is embedded into the ring-shaped groove 32, the pressing block 33 is adjacent to the ring-shaped groove 32 and is attached onto an upper surface of the fixing portion 1222, configured to cover a part of the fixing portion 1222 which is exposed out of the ring-shaped groove 32, so as to enable a more stable and reliable connection between the second connecting portion 122 and the supporting frame 3.

The method for forming a silica gel diaphragm provided by Embodiment 1 includes the following steps:

step S1: providing a hot pressing mould, and placing the dome 11 as an embedment into the hot pressing mould;

step S2: providing liquid silica gel, and injecting the liquid silica gel into the hot pressing mould along an edge of the dome 11;

step S3: hot pressing the liquid silica gel so as to form a silica gel membrane 12 which is connected with the dome 11, and molding so as to form a silica gel membrane component 1; and then cooling the molded silica gel membrane component 1;

step S4: providing an injection machine, placing the silica gel membrane component 1 as an embedment into the injection machine, forming a supporting frame for the silica gel membrane component 1 via injection molding, and molding so as to obtain the silica gel diaphragm 100.

Compared with the relevant art, the method for forming a silica gel diaphragm provided by Embodiment 1 has the following beneficial effects:

1. In the method for forming a silica gel diaphragm, the dome 11 is used as an embedment placed into the hot pressing mould, then the silica gel membrane 12 is formed by injecting liquid silica gel into the hot pressing mould and hot pressing, and the silica gel membrane 12 is adhered with the dome 11; further, the silica gel membrane 12 and the dome 11 as a whole are used as the embedments placed into the injection machine for injection molding and adhering, so as to connect the formed supporting frame 3 with the silica gel membrane 12, and further to adhere the supporting frame 3, the silica gel membrane 12 and the dome 11 together to form the silica gel diaphragm 100. In such forming method, the silica gel membrane 12 is not influenced by the sizes of the supporting frame 3 and the dome 11, which can reduce the influence of the shape and size of the supporting frame 3 on the hot pressing mould for forming the silica gel membrane, further reduce the size of the hot pressing mould or increase the mould cavity number based on the original size, so as to improve production efficiency.

2. The method for forming a silica gel diaphragm firstly adopts a manner of hot pressing to adhere the silica gel membrane 12 with the dome 11, then adopts a manner of injection molding to adhere the supporting frame 3 with the silica gel membrane 12, and then molding so as to obtain the silica gel diaphragm 100, which can prevent the problem that the adhered surface is not even, so as to further improve the performance of the silica gel diaphragm 100.

Embodiment 2

Figure 3:
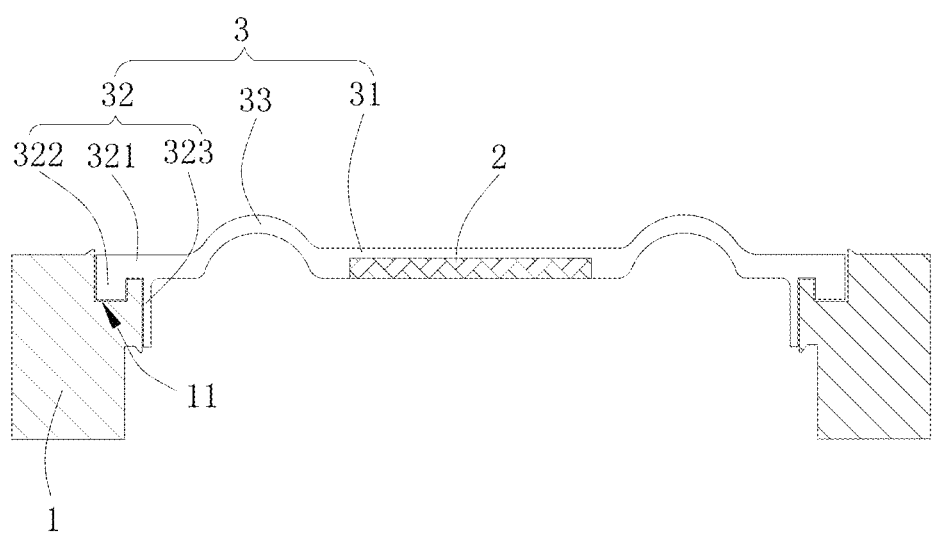
FIG. 3 is a structural schematic diagram of a silica gel diaphragm obtained using a method for forming a silica gel diaphragm in accordance with Embodiment 2.

FIG. 3 is a structural schematic diagram of a silica gel diaphragm obtained using a method for forming a silica gel diaphragm in accordance with Embodiment 2. The silica gel diaphragm 100 includes a supporting frame 1, a dome 2 and a silica gel membrane 3, two ends of the silica gel membrane 3 are connected with the supporting frame 1 and the dome 2, respectively.

The supporting frame 1 is a plastic supporting frame which is formed via plastic injection molding. The supporting frame 1 is shaped as a ring, including a ring-shaped groove 11 formed on an upper surface thereof.

The silica gel membrane 3 includes a first connecting portion 31, a second connecting portion 32 and a suspension portion 33 which connects the first connecting portion 31 with the second connecting portion 32. The first connecting portion 31 is connected with the dome 2, the second connecting portion 32 is connected with the supporting frame 1. Optionally, the dome 2 is wrapped up by the first connecting portion 31.

The second connecting portion 32 includes a body portion 321 which is connected with the suspension portion 33, a fixing portion 322 which is bended and extends from an end of the body portion 321, and a clamping portion 323 which is vertically connected with the body portion 321 and is spaced from the fixing portion 322, the fixing portion 322 is embedded into the ring-shaped groove 11, the clamping portion 323 is attached onto an inner wall of the supporting frame 1.

Embodiment 2 provides a method for forming a silica gel diaphragm. The method including the following steps:

step S1: providing a hot pressing mould, and placing the supporting frame 1 and the dome 2 as embedments into the hot pressing mould, the supporting frame 1 surrounds the dome 2 with an interval therebetween;

step S2: providing liquid silica gel, injecting the liquid silica gel into the hot pressing mould so as to fill the interval between the supporting frame 1 and the dome 2 and wrap the supporting frame 1 and the dome 2;

step S3: hot pressing the liquid silica gel so as to form the silica gel membrane 3, two ends of the silica gel membrane 3 being connected with the supporting frame 1 and the dome 2, respectively, and molding so as to form the silica gel diaphragm 100;

step S4: cooling the silica gel diaphragm 100.

Compared with the relevant art, the method for forming a silica gel diaphragm provided by Embodiment 2 has the following beneficial effects:

1. In the method for forming a silica gel diaphragm, the supporting frame 1 and the dome 2 are used as the embedments placed into the hot pressing mould, then the silica gel is injected into the hot pressing mould and flows into the ring-shaped groove of the supporting frame 1 and the interval between the supporting frame 1 and the dome 2 and thus wraps the supporting frame 1 and the dome 2, the silica gel membrane 3 is then formed via hot pressing such that the two ends of the silica gel membrane 3 are adhered with the dome 2 and the supporting frame 1, respectively. In such forming method, the silica gel membrane 3 is not influenced by the sizes of the dome 2 and the supporting frame 1, such that a same hot pressing mould can be used to manufacture various silica gel diaphragms of different specifications and shapes, which thus has a low production cost and a simple adhering process.

2. The method for forming a silica gel diaphragm adopts a manner of hot pressing to adhere the silica gel membrane 3, the supporting frame 1 and the dome 2 are adhered, which can prevent the problem that the adhered surface is not even, so as to further improve the performance of the silica gel diaphragm.

It should be noted that, the above are merely embodiments of the present disclosure, further modifications can be made for those skilled in the art without departing from the inventive concept of the present disclosure, however, all these modifications shall fall into the protection scope of the present disclosure.

What is claimed is:

1. A method for forming a silica gel diaphragm, comprising following steps:
    step S1: providing a hot pressing mould and a dome, and placing the dome as an embedment into the hot pressing mould;
    step S2: providing liquid silica gel, and injecting the liquid silica gel into the hot pressing mould along an edge of the dome;
    step S3: hot pressing the liquid silica gel so as to form a silica gel membrane which is connected with the dome, and then molding so as to form a silica gel membrane component; and
    step S4: providing an injection machine, placing the silica gel membrane component as an embedment into the injection machine, forming a supporting frame for the silica gel membrane component via injection molding, the formed supporting frame being connected with an edge of an end of the silica gel membrane far away from the dome, and then molding so as to obtain the silica gel diaphragm.

2. The method for forming a silica gel diaphragm as described in claim 1, wherein the step S3 further comprises a step of cooling the molded silica gel membrane component.

3. A silica gel diaphragm prepared using the method for forming a silica gel diaphragm as described in claim 1, comprising:
   a silica gel membrane,
   a dome, and
   a supporting frame;
   wherein the dome and the supporting frame are fixedly connected with the silica gel membrane, respectively; the silica gel membrane comprises a first connecting portion which is connected with the dome, a second connecting portion which is connected with the supporting frame, and a suspension portion which connects the first connecting portion with the second connecting portion.

4. The silica gel diaphragm as described in claim 3, wherein the supporting frame comprises a ring-shaped frame body and a ring-shaped groove which is formed on an upper surface of the frame body, the second connecting portion comprises a body portion which is connected with the suspension portion, and a fixing portion which is bended and extends from an end of the body portion, the fixing portion is embedded into the ring-shaped groove.

5. The silica gel diaphragm as described in claim 4, wherein the supporting frame further comprises a pressing block which is connected with the frame body and is configured to cover an upper surface of the fixing portion.

6. A silica gel diaphragm comprising:
   a silica gel membrane,
   a dome, and
   a supporting frame;
   wherein the dome and the supporting frame are fixedly connected with the silica gel membrane, respectively; the silica gel membrane comprises a first connecting portion which is connected with the dome, a second connecting portion which is connected with the supporting frame, and a suspension portion which connects the first connecting portion with the second connecting portion; the supporting frame comprises a ring-shaped frame body and a ring-shaped groove which is formed on an upper surface of the frame body; the second connecting portion comprises a body portion which is connected with the suspension portion, and a fixing portion which is bended and extends from an end of the body portion, the fixing portion is embedded into the ring-shaped groove; the supporting frame further comprises a pressing block which is connected with the frame body and is configured to cover an upper surface of the fixing portion.

* * * * *